US006728954B1

(12) United States Patent
Kesselman et al.

(10) Patent No.: US 6,728,954 B1
(45) Date of Patent: Apr. 27, 2004

(54) METHOD FOR ALLOWING EXECUTION MANAGEMENT OF OPTIMIZED CODE

(75) Inventors: Alexander Kesselman, Ramat Gan (IL); George Agasandian, Givataim (IL); Yoram Shacham, Zichron-Yaacov (IL); Arnon Mordoh, Kadima (IL)

(73) Assignee: Motorola, Inc., Schaumburg, IL (US)

( * ) Notice: Subject to any disclaimer, the term of this patent is extended or adjusted under 35 U.S.C. 154(b) by 543 days.

(21) Appl. No.: 09/608,804

(22) Filed: Jun. 30, 2000

(51) Int. Cl.$^7$ .............................. G06F 9/45; G06F 9/44; G06F 15/00; H02H 3/05
(52) U.S. Cl. ..................... 717/154; 717/129; 714/38; 712/227
(58) Field of Search ................................. 717/151–161, 717/124–135, 140–146; 714/38, 34; 712/227

(56) References Cited

U.S. PATENT DOCUMENTS

| 5,175,856 A | * 12/1992 | Van Dyke et al. | 717/151 |
| 5,371,747 A | * 12/1994 | Brooks et al. | 714/38 |
| 5,713,010 A | * 1/1998 | Buzbee et al. | 717/124 |
| 6,091,896 A | * 7/2000 | Curreri et al. | 717/125 |
| 6,263,489 B1 | * 7/2001 | Olsen et al. | 717/129 |

OTHER PUBLICATIONS

Ali–Reza Adl–Tabatabai et al., "Source–Level Debugging of Scalar Optimized Code," May 1996, ACM Press, Proceedings of the ACM SIGPLAN '96, pp. 33–43.*

Le–Chun Wu et al., "A New Framework for Debugging Globally Optimized Code," May 1999, ACM Press, Proceedings of the ACM SIGPLAN '99, pp. 181–191.*

Wu et al., "A New Framework for Debugging Globally Optimized Code," ACM SIGPLAN Notices, Association for Computing Machinery, New York, vol. 34, No. 5, May 1999, pp. 181–191.

Berger et al., "Source–Level Debugging of Optimized Programs Using Data Flow Analysis," Draft Paper, Department of Computer Science, Munich University of Technology, Mar. 1993, pp. 1–21.

Brender et al., "Debugging Optimized Code: Concepts and Implementation on DIGITAL Alpha systems," Digital Technical Journal, vol. 10, No. 1, Dec. 1998, pp. 81–89.

* cited by examiner

Primary Examiner—Anthony Nguyen-Ba

(57) ABSTRACT

A method for managing the execution of an optimized code. The method comprises of the steps of: (1) receiving at least a description of flow graphs of the optimized code and of a source code from which the optimized code was originated; receiving additional information that maps said flow graphs; and (2) managing the execution of the optimized code according to a selected mode and to at least one matched breakpoints being set along at least one path of the optimized flow graph.

21 Claims, 4 Drawing Sheets

METHOD FOR ALLOWING EXECUTION MANAGEMENT OF OPTIMIZED CODE

FIELD OF THE INVENTION

Figure 1:
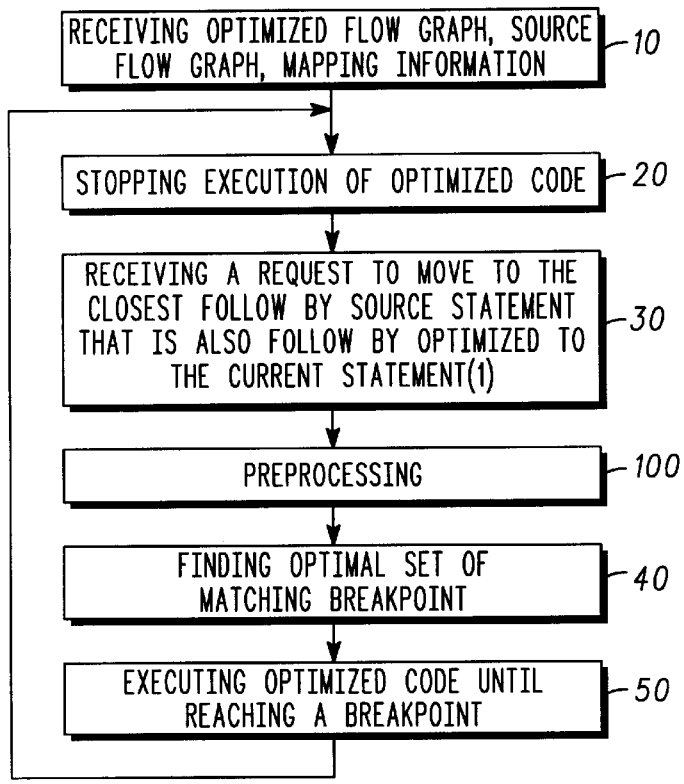

A method for optimized code debugging and especially a method for handling execution management of optimized code and for setting breakpoints in an optimized flow graph, for allowing an execution of an optimized code until a breakpoint is reached.

BACKGROUND OF THE INVENTION

A debugger is a software tool that enables a user to analyze and probe another computer program, the other computer program is referred to as the debugged computer program. A common method to analyze and probe the debugged computer program involves the execution of portions or steps of the debugged computer program. Usually, a user can execute a single instruction or statement and check various variables or other indications that can help the user to debug the debugged computer program.

There is a growing need to enhance the efficiency of software execution. One method for achieving said goal is to receive a source code and to compile it in a manner that provides an optimized object code. A compiler compiles the source code in a manner that best fits the hardware that is supposed to execute the object code. Such an optimization is vital when the software is to executed by parallel processors, but is also of great significant in other cases.

A premium is placed upon optimizing computer programs that are written in high level languages such as C++ and C. Writing computer program in these languages is easier than writing computer programs in low level languages such a assembler. Furthermore, a single software program written in high level language can be easily compiled to a plurality of low level language computer programs, to fit a plurality of processors. The efficiency of non-optimized object code that is generated by a non-optimizing compiler from a computer program that is written in a high level language is considerably worse than that of the corresponding assembly language code. Therefore, there is a need to optimize the object code.

The optimization process can largely complicate the relationship between the source code and the object code, so that the debugging of optimized code is very complex. The complexity can be attributed to various factors. A major factor is that during the optimization process statements are executed out of order and instructions are interleaved, i.e., a code can be moved out of sequence so that part of a statement, or a complete statement, is moved in relation to other statements causing that variables are assigned their values out of order. The optimization generated two major mapping problems: (a) which sequence of source statements should be reported when stepping through the optimized machine code. (b) Which machine code addresses should breakpoints be set at when stepping through the source code.

A thorough review of prior art optimized code debuggers can be found at the following article: R. F. Brender, J. E. Nelson and M. E. Arsenault "Debugging Optimized Code: Concepts and Implementation on DIGITAL Alpha Systems," Digital Technical Journal, Dec. 10, 1998". As seen from this article prior art methods of execution management of optimized code were very limited.

There is a need to provide a method for allowing an efficient execution management of optimized code. There is a further need to provide an improved method for allowing the execution management of optimized code that is not tailored to a certain optimization process.

BREIF DESCRIPTION OF THE INVENTION

Figure 3:
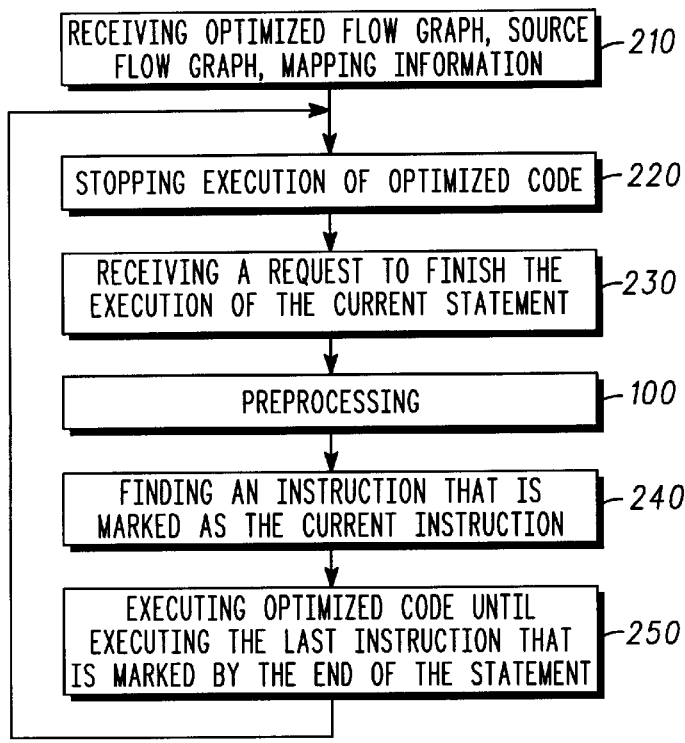
Figure 4:
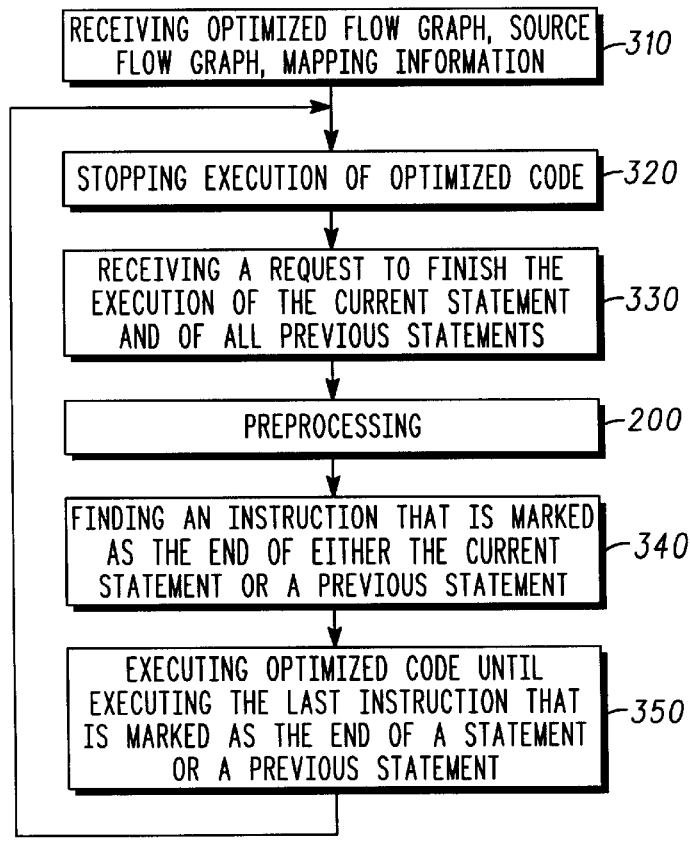
Figure 5:
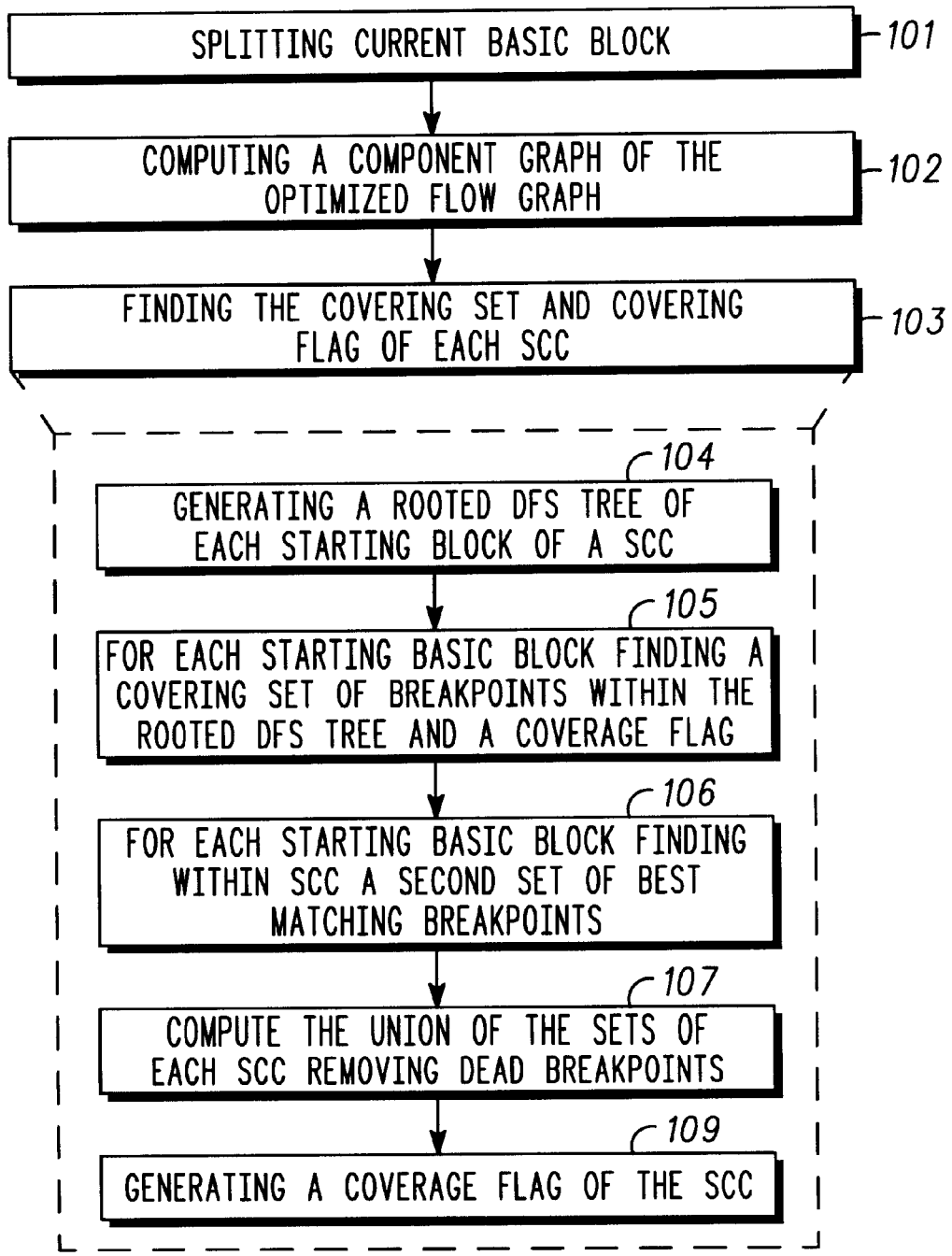
Figure 6:
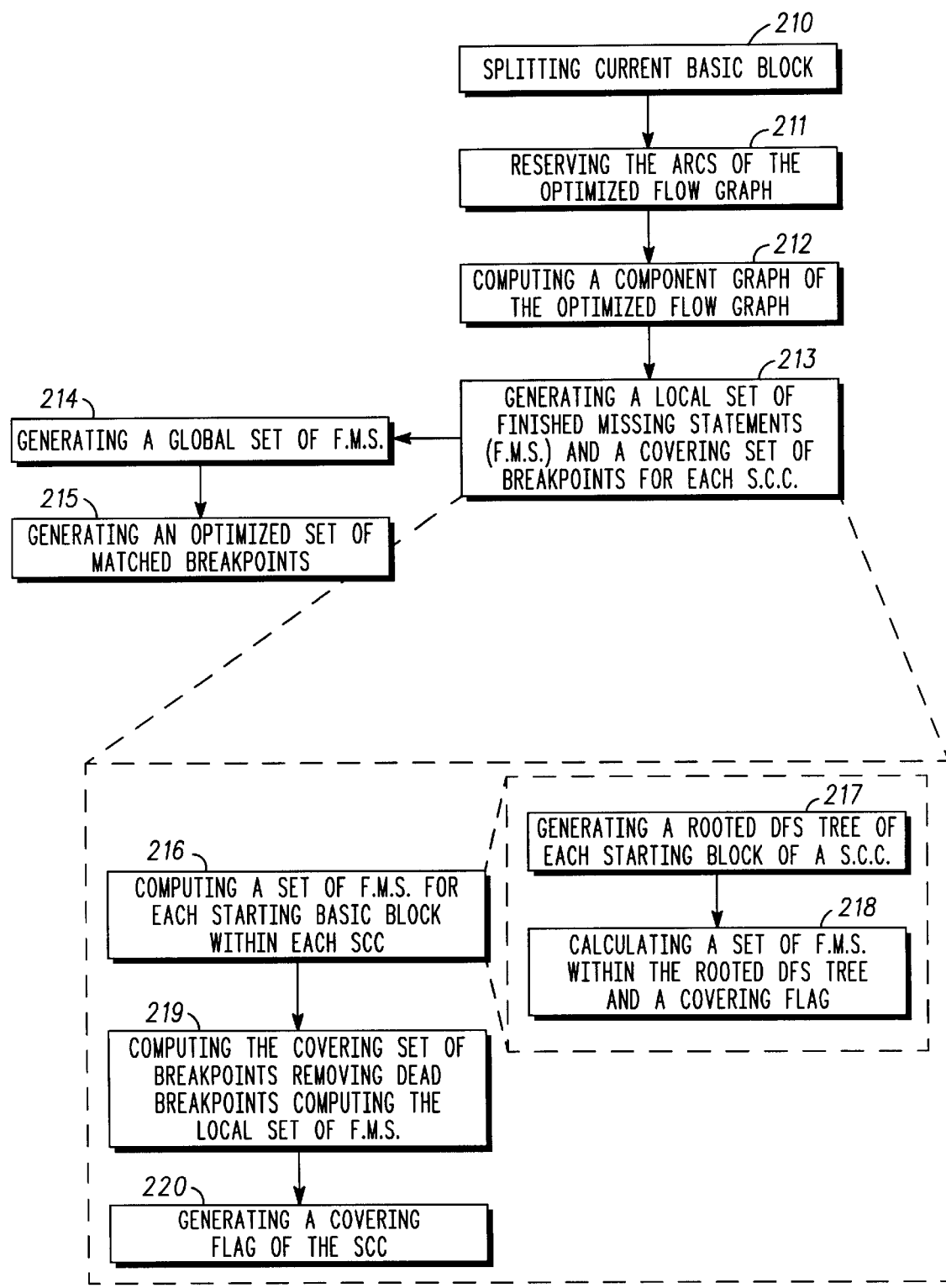

While the invention is pointed out with particularity in the appended claims, other features of the invention are disclosed by the following detailed description taken in conjunction with the following figures in which:

FIGS. 1–4 are a schematic flow charts of methods for managing the execution of an optimized code, that allows the implementation of the various modes, according to a preferred embodiment of the invention; and FIGS. 5–6 are a more detailed flow charts illustrating preprocessing steps of methods for managing the execution of an optimized code, according to a preferred embodiment of the invention.

DETAILED DESCRIPTION OF THE INVENTION

It should be noted that the particular terms and expressions employed and the particular structural and operational details disclosed in the detailed description and accompanying drawings are for illustrative purposes only and are not intended to in any way limit the scope of the invention as described in the appended claims.

The invention provides an improved method for allowing an efficient execution management of optimized code and an improved method for setting breakpoints in an optimized flow graph.

The invention provides an improved method for allowing an execution management of optimized code and a method for setting breakpoints in an optimized flow graph, that are not tailored to a certain optimization process.

The method for allowing an execution management of optimized code and the method for setting breakpoints in an optimized flow graph involve the reception of flow graphs of optimized and source code and additional information that maps source statements to optimized instructions and vice verse. A comparison of both flow graphs allows an execution management of optimized code that is not tailored to a certain optimization process. The method allows various stepping modes that enhance the debugging capability of a computer program.

The invention provides a method for allowing an execution management of optimized code and a method for setting breakpoints in an optimized flow graph that extend simple stepping by line through an optimized program to powerful modes using comparative analysis of the flow graphs. The user is provided with flexible and intuitive stepping modes that allow to debug optimized code at source level.

The invention provides a method for allowing execution management of optimized code and a method for setting breakpoints in an optimized flow graph whereas various code scheduling optimizations are supported without any restrictions. Furthermore, the method does not require to record information regarding all the performed optimizations or retain a correspondence between the source and the optimized flow graphs.

The invention provides a method for allowing an execution management of optimized code and a method for setting breakpoints in an optimized flow graph that provide real time stepping capability. When a step is performed the execution of the debugged computer program is stopped and a required set breakpoints is computed. The computation is followed by an uninterrupted execution of the debugged code until one of the breakpoints is hit.

The invention provides a method for allowing execution management of optimized code and a method for setting breakpoints in an optimized flow graph that support advanced architectures having multiple execution units by introducing a special instruction level source mapping approach.

The invention provides at least one of the following modes of debugging: (a) A first mode that allows the user to go to the first instruction of the statement that is follow-by-optimized to the current statement. (b) A second mode that allows the user to go to the first instruction of the closest follow-by-source statement which also is follow-by-optimized to the current statement. (c) A third mode that allows the user to go to the first instruction of the follow-by-optimized statement which also is follow-by-source to the current statement. (d) A fourth mode that allows the user to go to the first instruction of the statement that is follow-by-optimized to the end of the current statement. (e) A fifth mode that allows the user go to the first instruction of the statement that is follow-by-optimized to all the statements which are previous-by-source to the current statement and belong to some source flow path terminating at the current statement. Usually, the program counter defines the current statement. When the program counter points to an optimized instruction that has at least two portions of a source statement, a single statement can be chosen either by the user or by a predetermined criteria. Such a situation can occur when the source program is compiled to fit a parallel hardware architectures. In such a case an execution set that is pointed by the program counter may be mapped to multiple source statements.

For convenience of explanation only, and without limiting the scope of the invention the following terms shall have the following meaning:

"source statement" is statement written in a programming language. An executable statement species some action.

"general stepping" is executing just one more "step" of a program, whereas a "step" means a source statement code.

"source block" is a sequence of source statements which are always executed continuously. None of the source statements, except the last source statement in the block, can initiate a change of flow. None of them, except the first one can be a target of a change of flow. In a graph representation of the source program a source block appears as a node. The graph representation is referred to as a source flow graph)

"basic block" is a sequence of optimized instructions/machine instructions which are always executed continuously. None of the optimized instructions, except the last optimized instruction in the block, can initiate a change of flow. None of them, except the first one can be a target of a change of flow. In a graph representation of the optimized program a basic block appears as a node. The graph representation is referred to as a optimized flow graph.

"current basic block" is a basic block containing a current machine instruction. A current machine instruction is an instruction that is pointed by a current Program Counter.

"flow graph of a program" is a directed graph (B,E), where B is the set of blocks, E is the set of directed edges such that (bi, bj) belongs to E if and only if the flow control may immediately reach bj from bi.

"source flow path" is a sequence of source blocks (b1:s1, b2, ..., bn:sn) where bi+1 is an immediate successor of bi in the source flow graph. The flow path does not necessarily start or finish at a first block or a last block accordingly.

"optimized flow path" is a sequence of basic blocks (b1:adr1, b2, ..., bn:adrn) where bi+1 is an immediate successor of bi in the optimized flow graph. The flow path does not necessarily start or finish at a first block or a last block accordingly.

"follow by source"—a statement (s1) is follow-by-source to another statement (s2) if and only if one of the following conditions is fulfilled:
 (One) the source block of s1 is a predecessor of the source block of s2 within the source flow graph.
 (Two) both statements belong to the same source block and s1 appears before s2 in the sequence of statements.

"follow by optimize"—an optimized instruction (i1) is follow-by-optimize to another optimized instruction (i2) if and only if one of the following conditions is fulfilled:
 (One) the basic block of i1 is a predecessor of the basic block of i2 within the optimized flow graph.
 (Two) both optimized instructions belong to the same basic block and i1 appears before i2 in the sequence of optimized instructions.

"previous by source"—a statement (s1) is previous-by-source to another statement (s2) if and only if one of the following conditions is fulfilled:
 (One) the source block of s1 is a successor of the source block of s2 within the source flow graph.
 (Two) both statements belong to the same source block and s1 appears after s2 in the sequence of statements.

"previous by optimize"—an optimized instruction (i1) is previous-by-optimize to another optimized instruction (i2) if and only if one of the following conditions is fulfilled:
 (One) the basic block of i1 is a successor of the basic block of i2 within the optimized flow graph.
 (Two) both optimized instructions belong to the same basic block and i1 appears after i2 in the sequence of optimized instructions.

"terminal flow path" is a path within the optimized flow path that ends at a basic block that has no outgoing edges. Such a block is referred to as a terminal basic block.

"strongly connected component" is a maximum strongly connected subgraph of a flow graph that is not a part of any larger strongly connected subgraph. For any two nodes V1 and V2 belonging to the same component, there is a directed path from V1 to V2, and a directed path from V2 to V1 as well.

"external in-degree" is the number of upstream neighbors of a node within the strongly connected component that do not belong to the strongly connected component.

"external out-degree" is the number of downstream neighbors of a node within the strongly connected component that do not belong to the strongly connected component.

"set of covering breakpoints"—at least one matching breakpoint that 'cover' all the paths that start from a basic block.

"matched breakpoint"—is a breakpoint that satisfies the condition of a relevant mode. For example, during the first mode of operation a matched breakpoint is the first instruction of the statement that is follow-by optimize to the current statement.

"best matched basic block breakpoint" is the best matched breakpoint of a basic block. Preferably, it is the first in order best matched breakpoint of a basic block.

"best matched path breakpoint" is the best matched basic block breakpoint along the path. Preferably, it is the first in order best matched path breakpoint. A path and a basic block don't have to have a best matched breakpoint.

"necessary breakpoint" is a breakpoint that
(1) Along some terminal flow path starting at its successors all breakpoints have worse match according to the target mode of comparison.
(2) There exits a flow path between the current basic block and the breakpoint's basic block containing no matched breakpoint satisfying the first condition.

"dead breakpoint" is a breakpoint out of a set of breakpoints that fulfills the following condition: each flow path starting at the current basic block and passing through the dead breakpoint first hits another breakpoint of the set.

"optimal breakpoint set"—a set of breakpoints that does not have any dead breakpoints.

"starting basic block"—either a current basic block or a basic block with non zero external in degree.

"ending basic block"—either a non-zero external out-degree basic block or a terminal basic block.

"DFS tree"—a depth first search tree is the acyclic graph resulting from the removal of back edges of a cyclic graph.

"rooted DFS tree"—the result of a DFS (depth first) search within a strongly connected component that started from a basic block.

"missing finished statement"—a statement that has to be fully executed before the execution of the program is stopped.

"finished statement"—a statement that its execution is completed when passing through a path. Said path comprises an 'end of statement' label of the finished statement.

"missing statement"—a statement that is previous by source to the current statement.

"component graph"—a graph in which each node is an strongly connected component. If there was an arc between two nodes of distinct strongly connected components in the original graph than there is an arc between said strongly connected components in the component graph. The original graph is a graph in which the nodes are basic blocks.

"breakthrough path"—a path that starts at an starting block of an SCC and ends at a terminal basic block of said SCC.

The meaning of some of said terms is better illustrated by the following example: a source code comprises of five source blocks, SB1, SB2, SB3, SB4 and SB5. SB1 if followed by either SB2 or SB3. SB2 and SB3 are followed by SB4. SB4 is followed by SB5. SB1, SB2, SB3, SB4 and SB5 comprise of source statements L1–L5, L6–L9, L10–L13, L14–L19 and L20–L22 accordingly. An optimized code generated from said source code comprises of basic blocks B1–B5. B1 if followed by B2. B2 is followed by B4. B4 is followed by either B5 and B3. B3 is followed by B2. The optimized code has two full paths: a cycling path B1→B2→B4→B3→B2 and a terminal path B1→B2→B4→B5. B1 has an instruction I1 that was generated from L1. I1 is the best matched statement of B1. B2 has an instruction I2 that was generated from L14. I2 is the best matched statement of B2. B3 has an instruction I3 that was generated from L6. I3 is the best matched statement of B3. B4 has an instruction I4 that was generated from L10. I4 is the best matched statement of B4. B5 has an instruction I5 that was generated from L20. I5 is the best matched statement of B5. It is assumed that B1 is the current basic block and that the current source statement is L1. Along the cyclic path the best matched path breakpoint is B3:L6. Along the terminal path the best matched path breakpoint is B4:L10. B3:L6 is a dead breakpoint because even when the cyclic path is followed, breakpoint B4:L10 is 'hit' before breakpoint B3:L6. Therefore, the optimized set of breakpoints of said optimized graph contains a single breakpoint B4:L10.

According to a preferred embodiment of the invention, a method for handling execution management of optimized code starts by receiving the following information. Usually, a compiler provides the information:
(One) a flow graph of a source code;
(Two) a flow graph of the optimized code;
(Three) a mapping between statements in the optimized code and instructions of the source code;
(Four) a mapping between statements in the source code and instructions of the optimized code; wherein a first instruction within the optimized code that was generated from a statement is marked as the start of the statement.

The fifth mode requires additional information. So that optionally the information also comprises of marked last instructions. A last instruction within the optimized code that was generated from a statement is marked as the end of the statement.

FIGS. 1–4 are a flow chart graphs illustrating four methods 9, 9', 9'' for handling execution management of optimized code. Methods 9, 9' and 9'' of FIG. 1 allows to implement the second mode. Method 9' of FIG. 2 allows to implement the first and third modes. Method 9'' of FIG. 3 allows to implement the fourth mode. Method 9''' of FIG. 4 allows to implement the fourth mode. Said four methods allow a user to select at least one mode of said five modes. Methods for setting breakpoints in an optimized flow graph do not include steps of stopping the execution of a optimized code and receiving requests.

At least one out of the five modes can be offered by the method for handling execution management of optimized code and the method for setting breakpoints in an optimized flow graph.

(One) A first mode in which an optimized program is executed from a current statement until reaching a first instruction of the statement that is follow-by-optimized to the current statement;
(Two) a second mode in which an optimized code is executed, starting at a current statement and ending at a first instruction of the closest follow-by-source statement which also is follow-by-optimized to the current statement;
(Three) a third mode in which an optimized code is executed, stating at a current statement and ending at the first instruction of the follow-by-optimized statement which also is follow-by-source to the current statement;
(Four) a fourth mode in which an optimized code is executed, starting at a current statement and ending at a statement that is follow-by-optimized to the end of the current statement; and (Five) a fifth mode in which an optimized code is executed, starting at a current statement and ending at a first instruction of a statement that is follow-by-optimized to all statements which are previous-by-source to the current statement and belong to some source flow path terminating at the current statement. Said method comprises the steps of:

(1) receiving at least a description of flow graphs of the optimized code and of a source code from which the optimized code was originated; receiving additional information that maps said flow graphs; and (2) managing the execution of the optimized code according to a selected mode and to at least one matched breakpoints being set along at least one path of the optimized flow graph.

Referring to FIG. 1, illustrating method 9 for managing a execution of a computer program, method 9 comprising the steps of:

Receiving (box 10) from a compiler the following data: a flow graph of a source code. A flow graph of the optimized code. A mapping between statements in the optimized code and instructions of the source code. A mapping between statements in the source code and instructions of the optimized code; wherein a first instruction within the optimized code that was generated from a statement is marked as the start of the statement.

Stopping (box 20) an execution of the optimized code at a stop point.

Receiving (box 30) a request to move from a current statement to the closest follow by source statement that is also follow by optimized to the current statement.

Performing (box 100) a preprocessing step 100, when method 9 deals with a cyclic optimized flow graph. Step 100 is further illustrated in FIG. 5.

Finding (box 40) the best matching path breakpoint of each path in the optimized flow path, each path starts at the current basic block and ends at a terminal Executing (box 50) the optimized code until reaching a breakpoint.

Figure 2:
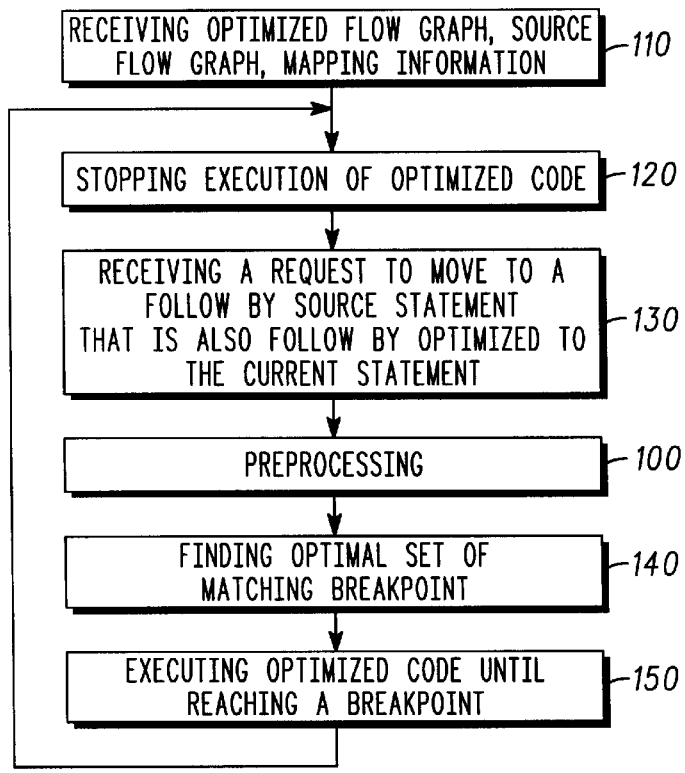

Method 9' of FIG. 2 is analogues to method 9 of FIG. 1 but (A) step 130 replaces step 30; and (B) a matched breakpoint has to match the second mode, During step receiving (box 130) a request to move from a current statement to a follow by source statement that is also follow by optimized to the current statement. Stems 110, 120, 100, 140, and 150 of FIG. 2 correspond to steps 10, 20, 100, 40, and 50, respetively, of FIG. 1.

Method 9" of FIG. 3 is analogues to method 9 of FIG. 1 but (A) step 230 replaces step 130; (B) step 210 replaces step 10; and (C) a matched breakpoint has to match the third mode. Step 210 of receiving from a compiler the following data: A flow graph of a source code. A flow graph of the optimized code. A mapping between statements in the optimized code and instructions of the source code. A mapping between statements in the source code and instructions of the optimized code; wherein a first instruction within the optimized code that was generated from a statement is marked as the start of the statement and wherein a last instruction within the optimized code that was generated from a statement is marked as the end of the statement. Step 230 of receiving (box 230) a request to finish the execution of the current statement. Steps 220, 100, 240, and 250 of FIG. 3 have the same meaning as steps 20, 100, 40, and 50 of FIG. 1 basic block.

Method 9''' of FIG. 4 is analogues to method 9 of FIG. 1 but (A) step 330 replaces step 30; (B) step 200 replaces step 100; (C) step 310, analogues to step 210, replaces step 10; (C) a matched breakpoint has to match the fifth mode. Steps 320, 340, and 350 of FIG. 4 have the same meaning as steps 20, 40, 50, reflectivity, of FIG. 1.

Step 310 of receiving from a compiler the following data: A flow graph of a source code. A flow graph of the optimized code. A mapping between statements in the optimized code and instructions of the source code. A mapping between statements in the source code and instructions of the optimized code; wherein a first instruction within the optimized code that was generated from a statement is marked as the start of the statement and wherein a last instruction within the optimized code that was generated from a statement is marked as the end of the statement.

Step 330 of receiving a request to finish the execution of the current statement and of all the previous statements.

Step 200 of preprocessing, comprising steps 211, 212, 213, 214 and 215. Step 213 conveniently comprises of steps 216, 219 and 220. Step 216 preferably comprises of steps 217 and 218. Step 200 is further explained in reference with FIG. 6.

A user can start to 'step' through the computer program. A user selects one of the five said modes and accordingly at least one breakpoint is set along the flow path of the optimized code. Then, the program is executed until a breakpoint is reached.

Usually a plurality of paths can start at the current currant basic block and accordingly a plurality of breakpoint have to be set so that all paths are covered by activating their best matched path breakpoints. Otherwise, the computer program can select an 'uncovered' path and go through the path without a stop, so that the user does not receive adequate information regarding the manner in which the program is executed.

According to one embodiment of the invention, during the setting of breakpoints all possible full paths are processed. According to a preferred embodiment of the invention, the setting of breakpoints is based upon a dynamic programming procedure. The application of said procedures provides an approximated optimal set. The approximated optimized set comprises of all the necessary breakpoints of the optimal set. Such a method allows to 'cover' all the terminal flow paths and encloses a part of cyclic paths.

Dynamic programming is an optimizing procedure that is especially applicable to problems requiring a sequence of interrelated decisions. Dynamic programming is based upon two basic principles. The first principle is known as the principle of optimality. The recognition that a given "whole program" can be solved if the values of the best solutions to certain sub problems can be determined. For example, if the whole problem is to find a minimum effort path from node A to node B through a graph having multiple node then according to said principle, the best path from node A to node B has the property that whatever the initial decision at node A, the remaining path to node B, starting from the next point after node A must be the best path from that point to node B. The second key principle is that if one starts at or near the end of said "whole problem" the sub problems are so simple as to have trivial solutions. Referring to the exemplary problem of finding the minimum effort path from node A to node B, this means to compute lengths of the needed minimum-effort paths by considering starting points further and further away from node B, finally working the way to node A, and Each decision transforms the current situation into a new one.

When the optimized flow graph is a directed acyclic graph (DAG) (i.e.—a graph that contains no cyclic paths) the approximated optimal set can be found by applying dynamic program principles. The 'whole problem' is to find a covering set of breakpoints. Conveniently, each iteration involves finding the set of basic blocks that can be accessed from a basic block and determining a value of flag that indicated if all paths starting from the basic block to the terminal basic block are 'covered' by breakpoints.

Conveniently, finding the covering/optimal set of breakpoint involves (a) Finding the best matched basic breakpoint for each basic block, starting from the current basic block. (b) Computing, in a recursive manner, the set of matched breakpoints that 'cover' all paths originating from a basic block and ending at a terminal basic block. Conveniently, further computing covering flags that indicate whether all the terminal paths starting at a basic block are covered by some breakpoint in the covering set. The cover flag is used to avoid the inclusion of dead breakpoints in said set of breakpoints that cover all said paths.

The following exemplary code illustrates a step of finding a covering set of breakpoints and a covering flag. The code is recursive and involves a comparison of a current node's covering set of breakpoints and covering flag to those of its successor nodes. If a successor node is not completely 'covered' by breakpoints or has a breakpoints covering set that is worse than that of the current node then the node's own breakpoints are retained. If all the successor nodes are fully covered and the current node's own set is worse then all the successor nodes sets the current node covering set is made up from the union of the successors' sets.

```
compute_reachable_subgraph_breakpoints (Node v,
    ExecutionModemode)
v→color=BLACK; /* the color of the node */
acc_set=NULL; /* the accumulating set */
comp_flag=TRUE; /* the comparisons conjunction */
all_succs_coverage=TRUE; /* the all successors coverage */
/* iterate through the adjacency list */
for each (w in Adj(v))
{
    /* if the successor is unvisited then visit it */
    if(w->color == WHITE)
        compute_reachable_subgraph_breakpoints(w);
        /* compare the current nodes's set with the set of
        the successor */
        result = compare sets(v->covering_set, w->covering_set,
    mode);
        /* update the conjunction flag */
        comp_flag = comp_flag and (not result);
        /* check whether the node is completely covered */
        if (v->full_coverage == TRUE)
        {
            /* in case there is a successor that is not completely
            covered or whose breakpoints set is worse than that of
            the current node then retain the node's own breakpoints
            set and return */
            if ((w->full_coverage == FALSE) or (result > 0)) {
                free_set(acc_set);
                return;
            }
        }
}
/* update the all successors coverage flag */
all_succs_coverage = all_succs_coverage and w->full_coverage;
/* accumulate the breakpoints set of the current successor*/
acc_set = union_sets(acc_set, w->covering_set);
}
/* in case all the successors are fully covered and the node's own set is
worse then all their sets the node's covering set is made up from the
union
of the successors' sets otherwise act according to the nodes full
coverage flag */
if ((all_succs_coverage = TRUE) and (comp_flag = TRUE))
    {
        free_set(v->covering_set);
        v->covering_set = acc_set;
    }
else
    {
    if (v->full_coverage == TRUE)
        free_set(acc_set)
    else
        v->covering_set = union_sets(v->covering_set, acc_set);
    }
/* set the full coverage flag of the node */
v->full_coverage = v->full_coverage or all_succs_coverage;
}
``` whereas:

v is current basic block.

Adj(v) is a set of basic blocks that succeed v.

Referring to FIG. 5, illustrating preprocessing step 100. Step 100 involves the following sub-steps:

(1) Splitting the current basic block at the point of the current machine instruction so that the second resulting sub-block becomes the current basic block (box 101).

(2) Computing a component graph of the optimized flow graph (box 102).

(1) Finding the covering set and covering flag of each SCC, starting from the current basic block within the current SCC, and from basic blocks with non-zero external in-degree within the other SCCS. (box 103). Step 103 comprises of the steps of:

(1) Generating (box 104) a rooted DFS tree for each starting block of a SCC.

(2) Finding (box 105) a covering set of breakpoints and coverage flag of each of the rooted DFS tree. Such a step can be implemented the mentioned above exemplary code. Conveniently step 105 involves finding in a recursive manner a covering set for each starting block of the SCC and finding a first set of matched breakpoints that 'cover' all paths within the rooted DFS tree originating from each starting basic block and ending at each ending basic block.

(3) Finding (box 106) for each starting basic block of each SCC, a second set of beat matching breakpoint along each cycle, starting at the starting basic block.

(2) Generating (box 107) a covering set of breakpoints of each SCC by uniting the covering sets of breakpoints of each starting block of each SCC and the second sets of best matching breakpoints of each starting block of each SCC and removing the dead breakpoint from said union of sets.

(4) Generating (box 109) a coverage flag for each SCC, said flag is the intersection of all coverage flags associated to an SCC.

In order to support the fifth mode, another preprocessing step 200, illustrated in FIG. 6, is performed. There is a need to perform an additional preprocessing. The placement of breakpoint further depends upon the selected source path and the previous execution path. The fifth mode requires that the execution of a program is stopped only after the execution of all source statements that are previous-by-source to the current statement and belong to some source flow path that terminates at the current statement (the path may be selected by the user or it may be selected backwards up to the first change-of-flow by the debugger).

Referring to FIG. 6 illustrating preprocessing step 200, according to a preferred embodiment of the invention; said step comprising of the steps of:

(1) Splitting the current basic block at the point of the current instruction so that the second resulting sub-block becomes the current basic block. (box 210).

(2) Reversing the arcs of the optimized flow graph (box 211).

(3) Computing a component graph of the optimized flow graph (box 212).

(4) Finding the covering set and covering flag of each SCC, starting from the current basic block within the current SCC, and from basic blocks with non-zero external in-degree within the other SCCs. (box 213). Finding a local set of finished missing statements of each SCC.

(5) Generating (box 214) a global set of finished missing statements which is the intersection of the local sets of finished missing statements of each SCC along a path that starts at a current basic block and ends at said SCC.

(6) Generating an optimized set of matched breakpoints (box 215). A breakpoint within a covering set of breakpoints is matched if the global set of finished missing statements of an SCC complements all the missing statements in the SCC.

Conveniently, step 213 comprises of the steps of:

(One) Computing (box 216) a set of missing finished statements for each starting basic block. In order to decide whether a basic block has a matched breakpoint there is a need to maintain the set of the missing finished statements. When a SCC has more then one path, its set of missing finished statements comprises of the missing finished statements sets for all paths between non-zero external in-degree nodes and non-zero external out-degree nodes. Conveniently, step 216 comprises of the step 217 of generating a rooted DFS tree of each starting block of a SCC and step 218 of calculating a coverage flag, a set of breakpoints and a set of necessary finished missing strings within the rooted DFS tree. Step 218 is preferably implemented by finding in a recursive manner a covering set for each starting block of the SCC and a set of necessary finished missing strings within the rooted DFS tree originating from each starting basic block and ending at each ending basic block.

(Two) Computing (box 219) a covering set of each SCC , computing a local set of finished missing statements of each SCC and removing dead breakpoints. Conveniently, the local set is an intersection of the finished missing breakpoints of each SCC and the covering set of breakpoints is the union of the covering sets of breakpoints of each SCC.

(Three) Generating a covering flag of each SCC. A covering flag of an SCC is set if and only if each breakthrough path 'hits' a breakpoint from the covering set of breakpoints of that SCC. Conveniently, said covering flag is the conjunction of covering flags of all the starting blocks within an SCC.

The following exemplary code demonstrated preprocessing step 200:

compute_missing_finished_statements (Node v, ExecutionMode mode)
v→color=BLACK; /* the color of the node */
acc_statements=NULL; /* intersection of successors' sets */

/* iterate through the adjacency list */
for each (w in Adj(v))
/* if the successor is unvisited then visit it */
if (w→color==WHITE) compute_finished_statements(w);
/* compute the intersection of the successors' statements */
if (w is the first neighbor) acc statements= w→statements;
else acc_statements=intersect_sets(acc_statements, w→statements);
/* set the node's set to be the union of its proper set of finished statements and the intersection of the successors sets */
Step 220 of FIG. 6 has the same meaning as step 20 of FIG. 1.
v→statements=union_sets(v→statements, acc_statements);

It should be noted that the particular terms and expressions employed and the particular structural and operational details disclosed in the detailed description and accompanying drawings are for illustrative purposes only and are not intended to in any way limit the scope of the invention as described in the appended claims.

Thus, there has been described herein an embodiment including at least one preferred embodiment of an improved method and apparatus for implementing a method for managing optimized code execution. It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather then the foregoing detailed description.

We claim:

1. A method for managing the execution of an optimized code, having at least one mode of the following modes:

(One) a first mode in which an optimized program is executed from a current statement until reaching a first instruction of the statement that is follow-by-optimized to the current statement;

(Two) a second mode in which an optimized code is executed, starting at a current statement and ending at a first instruction of the closest follow-by-source statement which also is follow-by-optimized to the current statement;

(Three) a third mode in which an optimized code is executed, starling at a current statement and ending at the first instruction of the follow-by-optimized statement which also is follow-by-source to the current statement;

(Four) a fourth mode in which an optimized code is execute starting at a current statement and ending at a statement that is follow-by-optimized to the end of the current statement;

(Five) a fifth mode in which an optimized code is executed, starting at a current statement and ending at a first instruction of a statement that is follow-by-optimized to all statements which are previous-bysource to the current statement and belong to some source flow path terminating at the current statement; wherein said method comprises the steps of:

(1) receiving at least an optimized flow graph and a source flow graph of a source code from which the optimized code was originated; receiving additional information that describes a connection between the optimized flow graph and the source flow graph; and (2) executing an optimized code according to one of the modes and to at least one matched breakpoints being set along at least one path of the optimized flow graph.

2. The method of claim 1 wherein step 1 (2) further comprises of a step of selecting a mode.

3. The method of claim 1 wherein further receiving markers that mark a first instruction within the optimized code that was generated from a statement as the start of the statement.

4. The method of claim 3 wherein further receiving markers that mark a last instruction within the optimized code that was generated from a statement is marked as the end of the statement.

5. The method of claim 1 wherein step 1 (2) further comprises of the steps of:

(1) finding a set of covering set of breakpoints and a covering flag;

(2) finding an optimal set of matching breakpoints; and (3) executing the optimized code until reaching a breakpoint from the optimal of matching breakpoints.

6. The method of claim 5 wherein step 6 (1) further comprises of the steps of:

(1) splitting the current basic block;

(2) reversing arcs of the optimized flow graph; and (3) generating a set of matched breakpoints with respect to the selected mode.

7. The method of claim 6 wherein step 7 (3) further comprises the steps of:

(1) generating a local set of finished missing statements and a covering set of breakpoints for each SCC formed within a flow graph;

(2) generating a global set of finished missing statements; and (3) marking a breakpoint within the covering set of breakpoints as a matched breakpoint if the global set of finished missing statements of an SCC complements all the missing statements in the SCC.

8. The method of claim 7 wherein step 8 (1) further comprises the steps of:

(1) computing a set of finished missing statements for each basic block within each SCC;

(2) computing a covering set of breakpoints for each SCC, removing dead breakpoints and computing a local set of finished missing statements; and (3) generating a covering flag of the SCC by computing conjunction of covering flags of all staring basic blocks of said SCC.

9. The method of claim 8 wherein step 9 (1) comprises the steps of:

(1) generating a rooted DPS tree of each starting basic block in each SCC; and (2) calculating a coverage flag and a set of finished da missing sets within the rooted DPS tree.

10. The method of claim 5 wherein step 6 (1) further comprises of the steps of:

(1) splitting the current basic block;

(2) computing a component graph of the optimized flow graph; and (3) finding the set of covering breakpoints and a coverage flag for each SCC.

11. The method of claim 10 wherein step 11 (3) further comprising the steps of:

(1) generating a rooted DFS tree of each starting block of a SCC;

(2) finding, a set of covering breakpoints within the rooted DFS tree and a coverage flag;

(3) finding, within the rooted DFS tree, a second set of best matching breakpoints along each cycle, starting at a starting basic block;

(4) generating set of covering breakpoints of each SCC by uniting covering sets breakpoints and second set of best matching breakpoints associated to said SCC and removing dead breakpoint; and (5) generating a coverage flag of each SCC by computing a conjunction of coverage flags of all starting blocks associated to said SCC.

12. A method for setting breakpoints in an optimized flow graph, for allowing an execution of an optimized code until a breakpoint is reached, according to at least one of the following modes:

(One) a first mode in which an optimized program is executed from a current statement until reaching a first instruction of the statement that is follow-by-optimized to the current statement;

(Two) a second mode in which an optimized code is executed, starting at a current statement and ending at a first instruction of the closest fellow-by-source statement which also is follow-by-optimized to the current statement;

(Three) a third mode in which an optimized code is executed, starting at a current statement and ending at the first instruction of the follow-by-optimized statement which also is follow-by-source to the current statement;

(Four) a fourth mode in which an optimized code is executed, starting at a current statement and ending at a statement that is follow-by-optimized to the end of the current statement;

(Five) a fifth mode in which an optimized code is executed, starting at a current statement and ending at a first instruction of a statement that is follow-by-optimized to all statements which are previous-by-source to the current statement and belong to some source flow path terminating at the current statement; wherein said method comprises the steps of:

(1) receiving at least an optimized flow graph and a source flow graph of a source code from which the optimized code was originated; receiving additional information that describes a connection between the optimized flow graph and the source flow graph;

(2) finding a set of covering breakpoints and a coverage flag; and (3) finding an optimal set of matching breakpoints to allow execution of the optimized ode according to one of the modes until at least one of the optimal set o matching breakpoints is reached.

13. The method of claim 12 wherein step 13 (1) is followed by a step of selecting a mode.

14. The method of claim 12 wherein further receiving markers that mark a first instruction within the optimized code that was generated from a statement as the start of the statement.

15. The method of claim 14 wherein further receiving markers that mark a last instruction within the optimized code that was generated from a statement is marked as the end of the statement.

16. The method of claim 12 wherein step 13 (2) further comprises of the steps of:
   (1) splitting the current basic block;
   (2) reversing arcs of the optimized flow graph; and
   (3) generating a set of matched breakpoints with respect to the selected-mode.

17. The method of claim 16 wherein step 18 (3) further comprises the steps of:
   (1) generating a local set of finished missing statements and a covering set of breakpoints for each SCC;
   (2) generating a global set of finished missing statements; and
   (3) marking a breakpoint within the set of covering breakpoints as a matched breakpoint if the global set of finished missing statements of an SCC complements all the missing statements in the SCC.

18. The method of claim 17 wherein step 19 (1) further comprises the steps of:
   (1) computing a set of finished missing statements for each basic block within each SCC;
   (2) computing a covering set of breakpoints for each SCC, removing dead breakpoints and computing a local set of finished missing statements; and
   (3) generating a covering flag of the SCC by computing conjunction of covering flags of all starting basic blocks of said SCC.

19. The method of claim 18 wherein step 20 (1) comprises the steps of:
   (1) generating a rooted DFS tree of each starting basic block in each SCC; and
   (2) calculating a coverage flag and a set of finished missing sets within the rooted DFS tree.

20. The method of claim 12 further comprises of the steps of
   (1) splitting the current basic block;
   (2) computing a component graph of the optimized flow graph; and
   (3) finding the set of covering set of breakpoints and a coverage flag for each SCC.

21. The method of claim 20 wherein step 22 (3) further comprising the steps of:
   (1) generating a rooted DFS tree of each starting block of a SCC;
   (2) finding, a set of covering breakpoints within the rooted DFS tree and a coverage flag;
   (3) finding, within the rooted DFS tree, a second set of best matching breakpoints along each cycle, starting at a starting basic block;
   (4) generating a covering set of breakpoints of each SCC by uniting covering sets breakpoints and second set of best matching breakpoints associated to said SCC and removing dead breakpoint; and
   (5) generating a coverage flag of each SCC by computing a conjunction of coverage flags of all starting blocks associated to said SCC.

* * * * *

UNITED STATES PATENT AND TRADEMARK OFFICE
CERTIFICATE OF CORRECTION

PATENT NO. : 6,728,954 B1
DATED : April 27, 2004
INVENTOR(S) : Alexander Kesselman et al.

It is certified that error appears in the above-identified patent and that said Letters Patent is hereby corrected as shown below:

<u>Title page,</u>
Item [75], Inventors, change "Zichron-Yaacov" to -- Zichron Yascov --.
Item [57], ABSTRACT,
Line 5, change "maps said flow graphs" to -- maps the flow graphs --.

<u>Column 12,</u>
Line 56, change "executed, starling" to -- executed, starting --.
Line 61, change "execute starting" to -- executed starting --.
Line 63, change "statement;" to -- statement; and --.

<u>Column 13,</u>
Line 1, change "belong to some" to -- belong to a --.
Line 25, change "covering set of breakpoints" to -- covering breakpoints --.
Line 29, change "optimal of matching" to -- optimal set of matching --.
Line 32, change "splitting the current basic block" to -- splitting a current basic block --.
Line 35, change "to the selected mode." to -- a selected mode. --.
Line 40, change "each SCC formed" to -- each Strongly Connected Componet (SCC) formed --.
Line 56, change "all staring basic blocks" to -- all starting basic blocks --.
Line 61, change "rooted DPS tree" to -- roote DFS tree --.
Lines 63-64, change "finished da missing sets within the rooted DPS" to -- finished and missing sets within the rooted DFS --.
Line 67, change "splitting the current" to -- splitting a current --.

<u>Column 14,</u>
Line 32, change "closet fellow-by-source" to -- closet follow-by-source --.
Line 43, change "statement;" to -- statement; and --.
Line 48, change "belong to some" to -- belong to a --.
Line 59, change "optimized ode according" to -- optimized code according --.
Line 61, change "o matching" to -- of matching --.

<u>Column 15,</u>
Line 7, change "splitting the current" to -- splitting a current --.
Line 10, change "to the selected mode." to -- to a selected mode. --
Line 15, change "each SCC;" to -- each Strongly Connected Component (SCC); --.

UNITED STATES PATENT AND TRADEMARK OFFICE
CERTIFICATE OF CORRECTION

PATENT NO.    : 6,728,954 B1
DATED         : April 27, 2004
INVENTOR(S)   : Alexander Kesselman et al.

It is certified that error appears in the above-identified patent and that said Letters Patent is hereby corrected as shown below:

Column 16,
Line 5, change "finished" to -- finished and --.
Line 9, change "splitting the current" to -- splitting a current --.
Lie 12, change "covering set of breakpoints" to -- covering breakpoints --.

Signed and Sealed this

Tenth Day of August, 2004

JON W. DUDAS
*Acting Director of the United States Patent and Trademark Office*